(12) United States Patent
Meier

(10) Patent No.: US 10,736,330 B2
(45) Date of Patent: Aug. 11, 2020

(54) DOUGH DIVIDING DEVICE AND DOUGH PROCESSING PLANT HAVING SUCH A DOUGH DIVIDING DEVICE

(71) Applicant: Werner & Pfleiderer Lebensmitteltechnik GmbH, Dinkelsbühl (DE)

(72) Inventor: Alexander Meier, Dürrwangen (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 161 days.

(21) Appl. No.: 16/117,168

(22) Filed: Aug. 30, 2018

(65) Prior Publication Data
US 2019/0069559 A1 Mar. 7, 2019

(30) Foreign Application Priority Data
Sep. 5, 2017 (DE) .......................... 10 2017 215 606

(51) Int. Cl.
*A21C 5/06* (2006.01)
*A21C 5/04* (2006.01)

(52) U.S. Cl.
CPC . *A21C 5/06* (2013.01); *A21C 5/04* (2013.01)

(58) Field of Classification Search
CPC ................................... A21C 5/04; A21C 5/06
See application file for complete search history.

(56) References Cited

U.S. PATENT DOCUMENTS

| 5,211,968 | A | | 5/1993 | Judex | |
|---|---|---|---|---|---|
| 5,227,174 | A | * | 7/1993 | Konig | A21C 5/00 425/147 |
| 5,775,804 | A | | 7/1998 | Meier | |
| 5,897,203 | A | * | 4/1999 | Kock | A21C 5/04 366/76.1 |

FOREIGN PATENT DOCUMENTS

| AT | 380625 B | 6/1986 |
|---|---|---|
| DE | 1256172 | 12/1967 |
| DE | 3826934 A1 | 3/1989 |
| DE | 4100243 A1 | 7/1992 |
| DE | 4243840 C2 | 7/1996 |
| DE | 19640176 A1 | 4/1998 |

* cited by examiner

*Primary Examiner* — Joseph S Del Sole
*Assistant Examiner* — Thu Khanh T Nguyen
(74) *Attorney, Agent, or Firm* — Smartpat PLC

(57) ABSTRACT

A dough dividing device has a housing. Arranged therein is a feed chamber, for feeding dough, and a delivery chamber, which is arranged downstream and in delivery communication with the feed chamber. A delivery piston is arranged in a displaceably driven manner inside the delivery chamber for delivering dough. A measuring chamber is arranged downstream of the delivery chamber. In an extended delivery position a face of the delivery piston is arranged in a passage chamber between the delivery chamber and the measuring chamber. The passage chamber is delimited by a wall which extends circumferentially around the piston face. At least one degassing channel serves for degassing the measuring chamber. In the delivery position of the delivery piston the degassing channel is arranged between the piston face and the passage-chamber wall and creates a gas connection between the measuring chamber and a surrounding area.

7 Claims, 4 Drawing Sheets

US 10,736,330 B2

DOUGH DIVIDING DEVICE AND DOUGH PROCESSING PLANT HAVING SUCH A DOUGH DIVIDING DEVICE

CROSS-REFERENCE TO RELATED APPLICATIONS

This application claims the priority of German Patent Application Serial No. DE 10 2017 215 606.6, filed on Sep. 5, 2017, pursuant to 35 U.S.C. 119(a)-(d), the content of which is incorporated herein by reference in its entirety as if fully set forth herein.

TECHNICAL FIELD

The invention relates to a dough dividing device and dough processing plant having a dough dividing device.

BACKGROUND

Dough dividing devices are generally known. Examples of dough dividing devices are disclosed in DE 42 43 840 A1, DE 41 00 243 A1, AT 380 625 B, DE 38 26 934 A1, DE 196 40 176 A1 and DE 1 256 172 A.

SUMMARY

It is an object of the present invention to develop a dough dividing device with improved portioning accuracy.

This object is achieved according to the invention by means of a dough dividing device with a housing, with a dough feed chamber for feeding dough, with a dough delivery chamber, which is arranged downstream of the feed chamber and is delivery communication with this, with a dough delivery piston, which is arranged in a displaceably driven manner inside the delivery chamber for delivering dough, with at least one dough measuring chamber, which is arranged downstream of the dough delivery chamber, wherein in an extended delivery position of the delivery piston its end-side piston face is arranged in a passage chamber between the delivery chamber and the measuring chamber, wherein the passage chamber is delimited by a wall which extends circumferentially around the piston face, the dough dividing device comprising at least one degassing channel, for degassing the measuring chamber, which in the delivery position of the delivery piston is arranged between the piston face and the passage-chamber wall and creates a gas connection between the measuring chamber and a surrounding area.

According to the invention, it has been recognised that an arrangement of a degassing channel between the delivery piston and a passage-chamber wall is advantageously suitable for an operationally reliable degassing of the measuring chamber. In particular, an undesirable escape of dough via the at least one degassing channel can be avoided. An undesirable air inclusion in the measuring chamber is avoided so that the portioning accuracy is increased. The dough dividing device, and especially the delivery piston, can be designed in such a way that a plurality of dough measuring chambers are supplied by the delivery piston or by a plurality of delivery pistons at the same time. The dough dividing device can therefore be of multipart design and especially be a component part of a correspondingly multi-rowed dough processing plant. The degassing channel can be arranged in a manner extending between a piston-casing wall, that is to say a piston skirt, of the delivery piston and the passage-chamber wall. An undesirable escape of dough via the degassing channel between the delivery piston and the passage-chamber wall can be avoided in such a way that if any dough passes through the degassing channel, it is delivered in a direction counter to the actual dough delivery but remains in the dough delivery chamber in this case. An uncontrolled escape of dough is avoided.

A multiplicity of degassing channels has proved to particularly suitable. A blocking of a degassing channel occurring during operation then has no effect on the deaerating function. The number of degassing channels per measuring chamber can be just 1, can be at least 2, can be at least 5, or can be even more.

A cross section of the degassing channel smaller than 10 $mm^2$ prevents an undesirable passage of dough through the degassing channel in a particularly effective manner and also prevents an undesirable blocking of the degassing channel. The cross section of the degassing channel can be smaller than 8 $mm^2$, can be smaller than 5 $mm^2$ and can even be smaller than 1 $mm^2$. Providing a plurality of degassing channels are made available, an overall cross section of the degassing channels can naturally be larger than 10 $mm^2$.

An arrangement of the degassing channel in the region of the upper passage-chamber wall section of the passage chamber wall ensures degassing where air bubbles are to be anticipated in the dough which is delivered to the measuring chamber by the delivery piston, therefore ensures particularly effective degassing. Alternatively or additionally, the at least one degassing channel can also be arranged in the region of the lower passage-chamber wall section and/or in the region of at least one of the two side passage-chamber wall sections.

An embodiment of the degassing channel being designed as a groove in a casing wall of the delivery piston in the delivery piston is of a low cost with regard to production engineering. Alternatively or additionally, the at least one degassing channel may be constructed in the passage-chamber wall. A degassing channel, constructed as a groove, in the delivery-piston casing wall and/or in the passage-chamber wall can extend parallel to the delivery direction of the delivery piston. This, however, is not compulsory. The groove can also be of spiral, zigzag, or serpentine design or be designed in another shape.

A length of the degassing channel groove in the delivery direction of the delivery piston such that it extends from a piston-face groove outlet to the dough feed chamber in the delivery position of the delivery piston is sufficient for reliable degassing. The groove does not have to be of longer design, which has production engineering advantages.

The advantages of a dough processing plant having a dough dividing device according to the invention correspond to those which have already been explained above with reference to the dough dividing device.

An exemplary embodiment of the invention is explained in more detail below with reference to the drawing.

DETAILED DESCRIPTION

A dough dividing device 1 serves for the exact portioning of dough pieces, starting for a dough mass which is fed to the dough dividing device. The dough dividing device 1 has a housing 2.

A dough feed chamber 3, which is designed as a feed hopper, serves for feeding the dough. A dough delivery chamber 4 is located downstream of the dough feed chamber 3. Imaginary lateral limits of the dough delivery chamber 4 beneath the dough feed chamber 3 are shown by dashed lines in FIG. 1. The dough delivery chamber 4 is in gravimetric delivery communication with the dough feed chamber 3.

Figure 2:
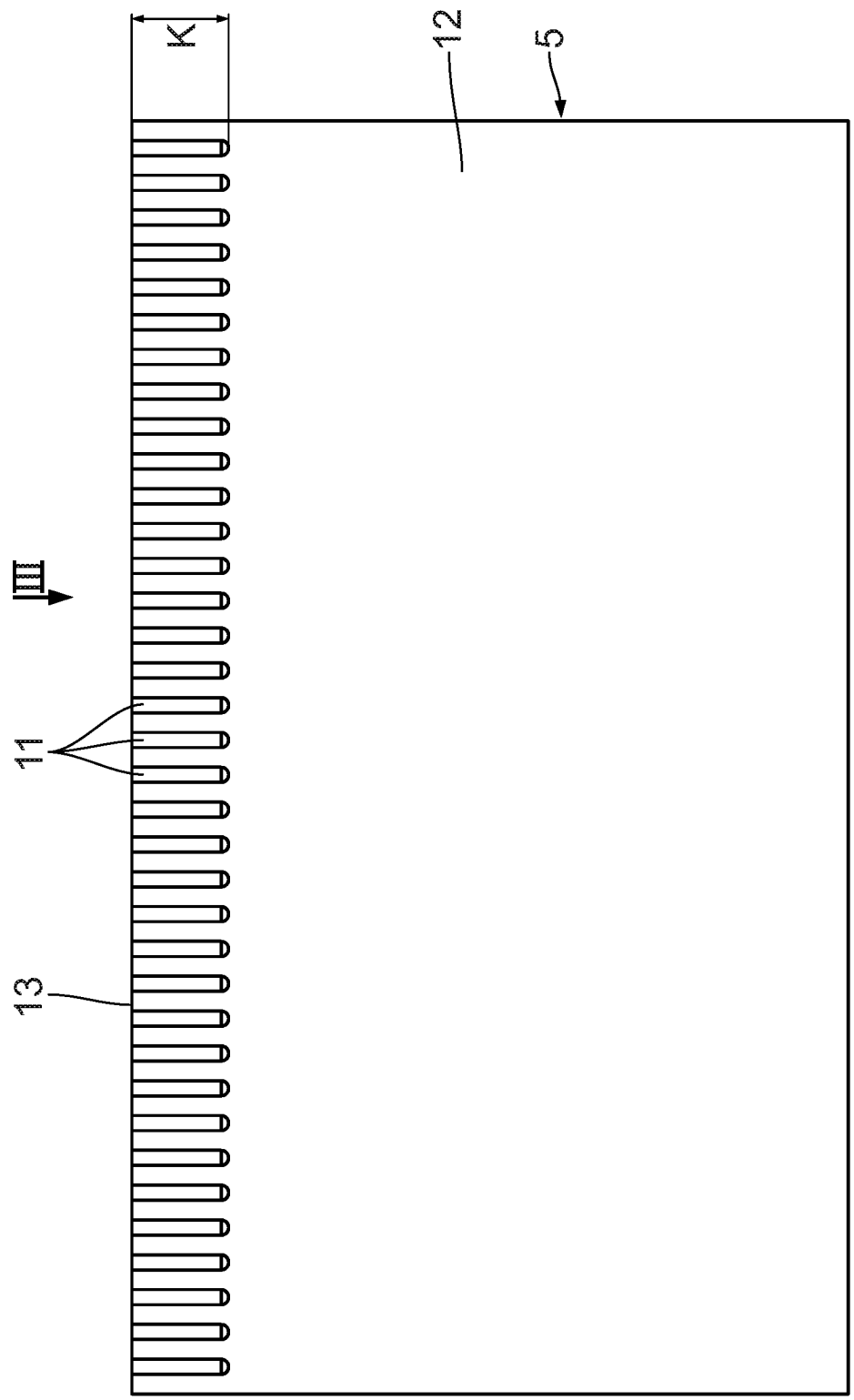
FIG. 2 shows a plan view of a dough delivery piston of the dough dividing device.

Displaceably arranged inside the delivery chamber 4 is a dough delivery piston 5 which is driven by a drive crank 5a via a crank drive for delivering dough. The delivery piston 5 is shown in more detail in FIGS. 2 to 4 and is explained in more detail below.

Figure 1:
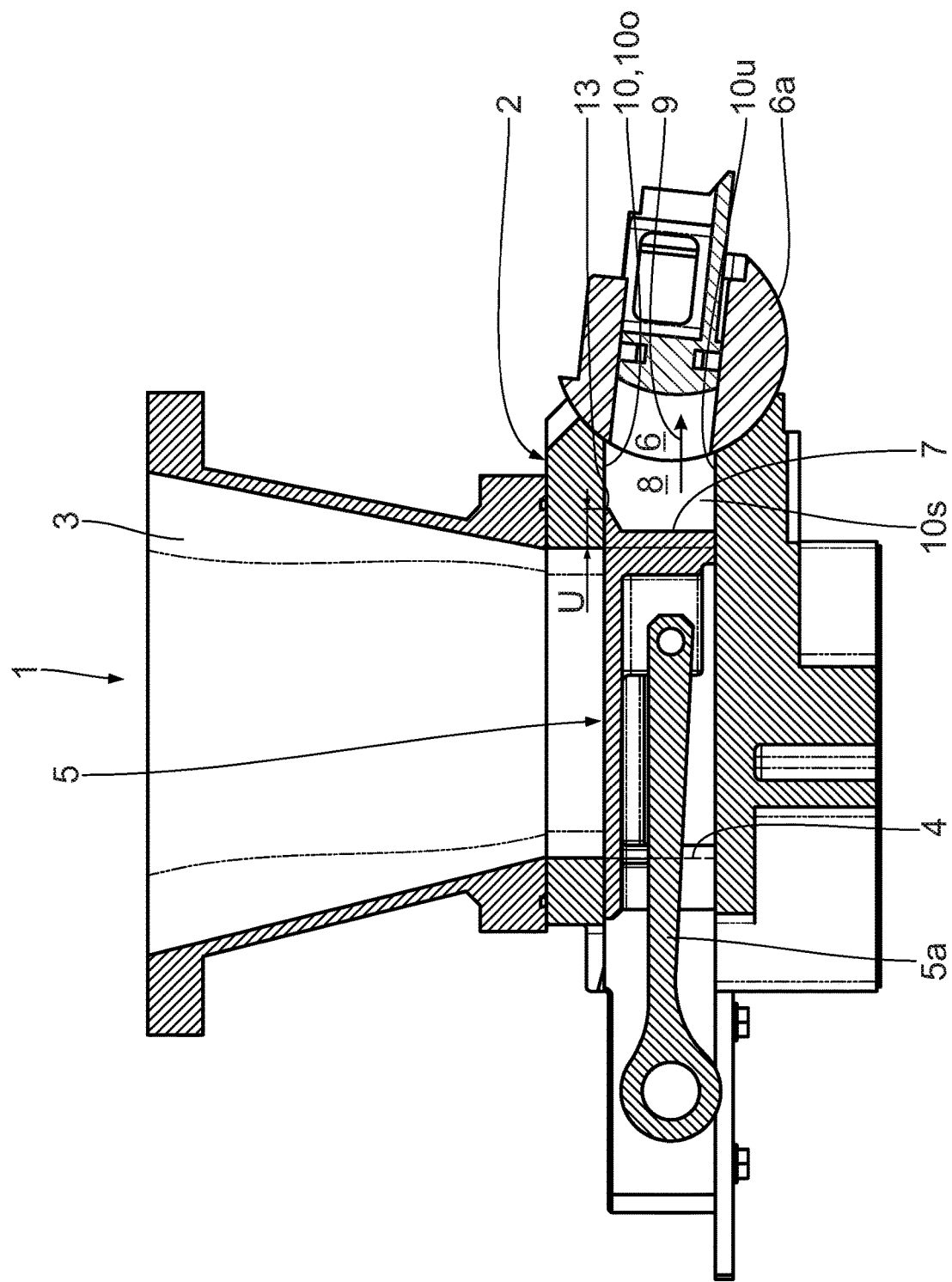
FIG. 1 shows a longitudinal section through a dough dividing device.

Via the crank drive, the delivery piston 5 can be displaced between an extended delivery position, shown in FIG. 1, and a neutral position completely retracted from the delivery chamber 4, which is not shown in the drawing.

A dough measuring chamber 6 is in turn arranged downstream of the dough delivery chamber 4 in delivery communication.

In the delivery position of the delivery piston 5, its end-side piston face 7 is arranged in a passage chamber 8 between the delivery chamber 4 and the measuring chamber 6. The passage chamber 8, with regard to a dough delivery direction 9, is circumferentially delimited by a wall 10 which extends circumferentially around the piston face 7 in the delivery position. The encompassing passage-chamber wall 10, in the operating position of the dough dividing device 1, has an upper wall section 10o, a lower wall section 10u and two oppositely disposed side wall sections 10s, of which the side wall section 10s facing the viewer is visible in FIG. 1.

The measuring chamber 6 is delimited by a cylinder 6 which can pivot around an axis which is perpendicular to the drawing plane of FIG. 1.

The previously described principle components of a dough dividing device 1 are basically known from the prior art, for example from DE 42 43 840 A1, DE 41 00 243 A1 and DE 196 40 176 A1.

The delivery piston 5 can supply a plurality of measuring chambers 6, which are arranged in a row next to each other perpendicularly to the drawing plane of FIG. 1, at the same time. The dough dividing device 1 is a component part of a correspondingly multi-rowed dough processing plant with additional components arranged downstream, for example with a working device and a baking device which are shown in more detail in the drawing and are basically known from the prior art. Alternatively, the dough dividing device 1 can also be a component part of a single-row dough processing plant.

The dough dividing device 1 has at least one degassing channel 11 (cf. FIGS. 2 to 4) for degassing the measuring chambers 6. In practice, the dough dividing device 1 may have a multiplicity of degassing channels 11. The dough dividing device 1 may have 36 degassing channels as depicted in the exemplary embodiment. In the delivery position of the delivery piston 5, the degassing channels 11 are arranged between the end-side piston face 7 and the passage-chamber wall 10, specifically between a casing wall of the delivery piston, that is to say a piston skirt, and the passage-chamber wall 10. In the delivery position of the delivery piston 5, the degassing channels 11 create a gas connection between the measuring chambers 6 and a surrounding area, specifically the dough feed chamber 3.

Figure 3:
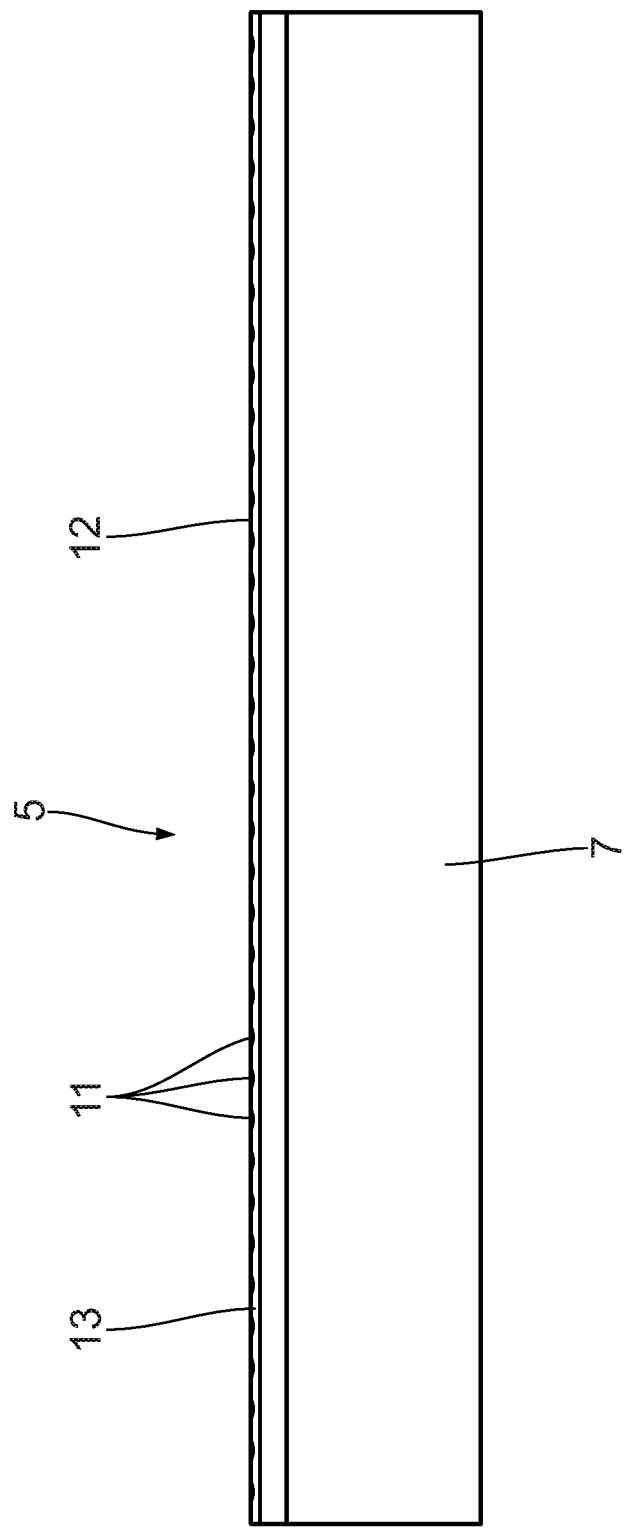
FIG. 3 shows an end view of the delivery piston, as seen from the viewing direction III in FIG. 2.
Figure 4:
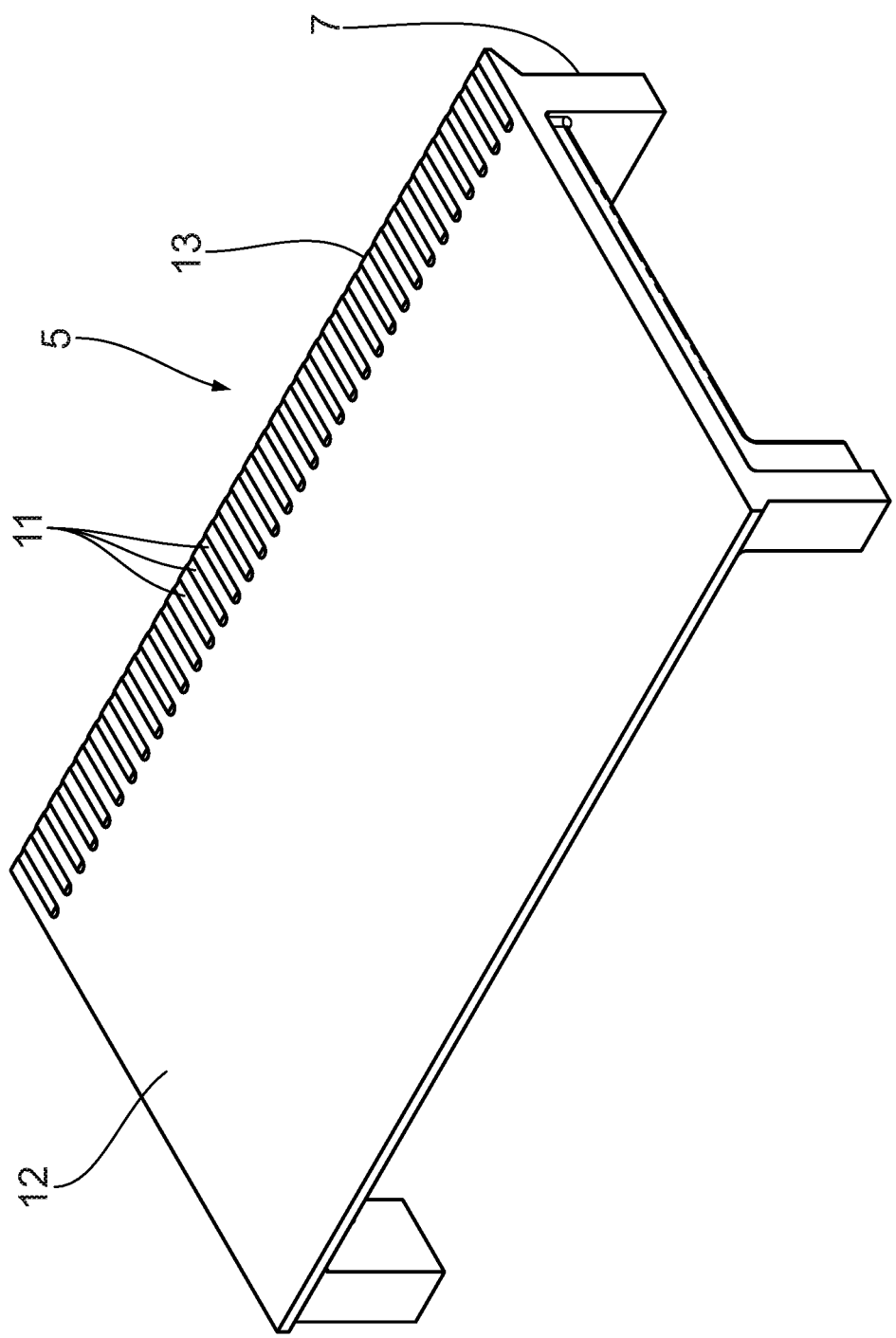
FIG. 4 shows a perspective view of the delivery piston.

The degassing channels 11 are designed as grooves in a casing wall 12 of the delivery piston 5 and open out into the piston face 7 of the delivery piston 5 (cf. FIG. 3). The respective degassing channel 11 opens out into the piston face 7 via a piston-face groove outlet 13.

Alternatively or additionally, the at least one degassing channel can be constructed in the passage-chamber wall 10.

The at least one degassing channel 11 is arranged in the region of the upper passage-chamber wall section 10o. Alternatively or additionally, the at least one degassing channel 11 can be arranged in the region of the lower passage-chamber wall section 10u and/or in the region of at least one of the two side passage-chamber wall sections 10s.

The groove of the respective degassing channel 11 is of such length along the delivery direction 9 of the delivery piston 5 that it extends from the piston-face groove outlet 13 to the dough feed chamber 3 in the delivery position of the delivery piston 5.

A channel length K (cf. FIG. 2) of the degassing channels 11 is therefore longer than an overlap U of the delivery piston 5 (cf. FIG. 1) by the upper passage-chamber wall section 10o. As a result of this, a reliable gas connection is created between the measuring chamber 6 and the surrounding area in the positions of the delivery piston 5 and the measuring-chamber cylinder 6a shown in FIG. 1.

In these positions, a reliable deaeration (degassing) of the measuring chamber 6 results during the portioning of dough compressed in the measuring chamber 6. As a result of this, a precise portioning accuracy is ensured.

A cross section of the respective degassing channel 11 is smaller than 10 mm$^2$. This ensures that dough is not undesirably pushed back through the degassing channels 11 from the passage chamber 8 into the dough feed chamber 3.

For dough positioning, the delivery piston 5 is first of all in the neutral position, completely retracted from the delivery chamber 4. Dough is then fed from above, that is to say from the feed chamber 3. The delivery piston 5, with the aid of the crank drive, is then displaced into the delivery position shown in FIG. 1, as a result of which a dough portion is delivered into the measuring chamber. Via the degassing channels 11, a reliable deaeration of the measuring chamber 6 into the dough feed chamber 3 is ensured. The measuring-chamber cylinder 6a now rotates from the portioning position shown in FIG. 1 anticlockwise into a dispensing position and dispenses the dough portion from the measuring chamber 6 towards a downstream dough processing component of the dough processing plant, for example to a working chamber of a working device.

A cross section of the respective degassing channel 11 can be round, can be cornered, can be oval, can be trapezoidal, can be polygonal, can have the shape of an ellipse or of an elongated hole, can be dovetail shaped, can be T-shaped and/or can have the shape of a trapezoidal groove.

What is claimed is:

1. A dough dividing device, comprising:
   a housing;
   a feed chamber for feeding dough;
   a delivery chamber which is arranged downstream of and in delivery communication with the feed chamber;
   at least one measuring chamber which is arranged downstream of the delivery chamber;
   a delivery piston which is arranged in a displaceably driven manner inside the delivery chamber for delivering dough from the feed chamber to the at least one measuring chamber, wherein in an extended delivery position a face of the delivery piston is arranged in a passage chamber between the delivery chamber and the at least one measuring chamber, the passage chamber being delimited by a passage-chamber wall which extends circumferentially around the face of the delivery piston; and at least one degassing channel, for degassing the at least one measuring chamber, which in the extended delivery position of the delivery piston is arranged between the face of the delivery piston and the passage-chamber wall and creates a gas connection between the at least one measuring chamber and a surrounding area.

2. The dough dividing device according to claim 1, comprising a plurality of degassing channels.

3. The dough dividing device according to claim 1, wherein a cross section of the degassing channel is smaller than 10 mm$^2$.

4. The dough dividing device according to claim 1,
wherein the passage-chamber wall includes an upper wall section, a lower wall section, and two oppositely disposed side wall sections, and
wherein the at least one degassing channel is arranged in a region of the upper wall section.

5. The dough dividing device according to claim 1, wherein the at least one degassing channel is a groove in a casing wall of the delivery piston.

6. The dough dividing device according to claim 5, wherein the groove is of such length that it extends from a piston-face groove outlet to the feed chamber when the delivery piston is in the extended delivery position.

7. A dough processing plant having a dough dividing device according to claim 1.

* * * * *